Patented Dec. 5, 1939

2,182,420

UNITED STATES PATENT OFFICE 2,182,420

METHOD OF MAKING TITANIUM DIOXIDE

Benjamin Wilson Allan and L'Roche G. Bousquet, Baltimore, Md., assignors to American Zirconium Corporation, Baltimore, Md., a corporation of Maryland No Drawing. Application February 11, 1935, Serial No. 6,130

7 Claims. (Cl. 23—202)

This invention relates to titanium dioxide and has reference to a new and improved method for making pigment titanium dioxide. In particular it relates to the hydrolysis of titanium sulphate solutions of controlled compositions to give precipitates which on calcination give improved tinting strength. More particularly, it contemplates the use of high concentrations of soluble sulphates other than those of titanium, to give improved precipitates; and it contemplates economies in the present processes of manufacture through the use of these high sulphate concentrations.

Titanium dioxide is made commercially by the hydrolysis of sulphate solutions, obtained by reacting on ilmenite with sulphuric acid, and dissolving the mass in water or dilute acid. These solutions contain both iron and titanium in solution; the ratio of Fe to $TiO_2$ in the solution is ordinarily about 0.7 to 0.8. In order to get iron-free precipitates, it has been the practice to hydrolize the titanium from solutions containing low Fe concentrations—between 30 and 60 grams per liter. Dilute solutions of the reaction mass can be employed; but the concentration of titanium dioxide in such event falls to 50 to 80 grams per liter; and the experience of the art is that concentrated solutions of $TiO_2$ (from 160 to 180 grams per liter) are necessary to get good pigment properties where the hydrolysis product is essentially titanium hydrate. It has therefore been the practice to reduce the iron content by crystallizing ferrous sulphate from the solution, or by some other expedient, and adjusting the solution, partially freed from iron, to the desired concentration.

In order to obtain satisfactory yields of pigment, and rapid hydrolysis, it has been necessary to induce hydrolysis by means of some agent which renders the solution unstable, for instance by coprecipitation of alkaline earth sulphate with an alkaline earth base, or by the introduction or formation in situ of colloidal titanium dioxide. These hydrolysis inducers are generally known as seeding agents.

We have discovered that good pigment titanium dioxide may be produced with solutions of titanium containing as low as 100 grams per liter of $TiO_2$, by increasing the concentration of soluble sulphates in solution.

We have further discovered that if concentrations and acidity be properly adjusted, the hydrolysis may take place in the presence of large amounts of iron, without harmful effect on the color of the pigment, and the soluble sulphate present may be essentially ferrous sulphate. It is thus possible to hydrolize a purified solution obtained directly from the ilmenite ore, without concentration or removal of iron, merely by adjusting the acid and combined sulphate concentrations, and adding a seeding agent. The salt concentration may be adjusted by adding additional ferrous sulphate, or by the addition of any soluble sulphate which will not hydrolize with the titanium; and these sulphates may be used to replace ferrous sulphate wholly or in part. Magnesium, tin, aluminum, zinc, sodium, potassium and ammonium sulphates are typical suitable products.

We are aware that salts have hitherto been added to titanium sulphate solutions for use in pressure hydrolysis, but these additions were not made to get definite concentrations of salts for given $TiO_2$ concentrations, to improve the hydrolysis products.

Many modifications of our process are possible, but three general methods only will be given to enable those skilled in the art to carry out the process in any of its modifications.

A titaniferous ore, preferably ilmenite, ground or unground, is digested with concentrated sulphuric acid in the proportion of one to two parts $H_2SO_4$ to one part of ore. The resulting dry mass is dissolved in water or titanium and acid bearing liquor—a by-product of a subsequent operation—in the presence of a reducing agent, such as results when metallic iron or zinc is introduced into the dissolving liquor or titanous sulphate crystals are added. The titanium liquor thereby produced, in which all of the iron is in the ferrous state, which condition is assured by the presence of a small amount of titanous sulphate, is then freed of its undissolved solids. The clarification is carried out by settling after coagulation of the slimes by means of glue, or by filtration after the addition of diatomaceous earth, or by a combination of the two methods. The clarified titanium solution thus obtained will have an approximate composition somewhere within the following range (all concentrations in grams per liter):

| | |
|---|---|
| Total TiO$_2$ | 120–160 |
| Reduced TiO$_2$ | 5 |
| Fe | 96–128 |
| Total H$_2$SO$_4$ | 462–617 |
| Active H$_2$SO$_4$ | 294–392 |
| Free H$_2$SO$_4$ | 147–196 |
| F. A. per cent | 20–130 |
| $\frac{Fe}{TiO_2}$ about | 0.8 |

Note: Active acid=Ti equivalent H$_2$SO$_4$ to yield TiOSO$_4$+Free H$_2$SO$_4$
F. A.=per cent factor of acidity=

$$\frac{Free\ acid}{Ti\ equiv.\ H_2SO_4} \times 100$$

EXAMPLE 1

Treatment of the solution where the factor of acidity of the titanium solution is between 70–130%.

To a solution preferably within the above range, either before or after clarification, sufficient base is added to give a factor of acidity of about 50%. For this purpose the hydroxide or carbonate of any metal yielding a soluble sulphate such as Na$_2$CO$_3$, ZnCO$_3$, MgCO$_3$, etc. can be used. The following is an analysis of a titanium sulphate solution prepared as above, using sodium carbonate as the alkali (all concentrations in grams per liter):

| | |
|---|---|
| Total TiO$_2$ | 145 |
| Reduced TiO$_2$ | 7.5 |
| Fe | 104.3 |
| Na$_2$SO$_4$ | 104.0 |
| Total H$_2$SO$_4$ | 468 |
| Active H$_2$SO$_4$ | 285 |
| Free H$_2$SO$_4$ | 107 |
| F. A. per cent | 60 |

$$\frac{Ratio\ Fe + Fe\ equiv.\ of\ Na_2SO_4}{TiO_2} = 1.0$$

A solution such as the above, which may vary in concentration of TiO$_2$ between 100–170 grams per liter, is boiled for from five to six hours after the addition of a seeding agent, such as a titanium gel prepared as described in the co-pending Allan application #731,998, filed June 22nd, 1934 now Patent No. 2,040,823, issued May 19, 1936.

The hydrolized product is washed free of iron and calcined at between 800–1000° C., after the addition of a conditioning agent. The calcined product has good hiding power and other desirable pigment properties.

EXAMPLE 2

Procedure where the factor of acidity of the titanium solution is between 20% to 70% and the TiO$_2$ concentration between 100–155 grams per liter.

Titanium solutions corresponding to the above specifications are prepared from what is known as basic mass, which is prepared by digesting ilmenite with less sulphuric acid than is necessary to yield titanium disulphate, Ti(SO$_4$)$_2$. For the purpose of this process it is desirable to obtain a titanium solution with approximately the following analysis (all concentrations in grams per liter):

| | |
|---|---|
| Total TiO$_2$ | 154 |
| Reduced TiO$_2$ | 5.07 |
| Fe | 115 |
| Total H$_2$SO$_4$ | 454 |
| Free H$_2$SO$_4$ | 64 |
| Active H$_2$SO$_4$ | 252 |
| F. A. per cent | 34 |
| Fe/TiO$_2$ ratio | .746 |
| S. G. at 44° C | 1.54 |

Such a solution is obtained directly on dissolving the digestion mass followed by filtration and without concentration.

To such a solution, TiO$_2$ as gel, in an amount corresponding to approximately 2% of the total titanium in the solution is added, and the solution boiled for from five to six hours—with a recovery of the TiO$_2$ present of 95% or better. The pigment is washed free of impurities and calcined.

In the event that it is desired to use titanium solutions with a lower TiO$_2$ concentration than the above, or to improve the tinting strength, use is made of the addition of FeSO$_4$, Na$_2$SO$_4$, or other soluble sulphate, the amount of soluble salt needed depending on the TiO$_2$ concentration.

EXAMPLE 3

Procedure where the factor of acidity of the titanium solution is between 20–70% and the TiO$_2$ concentration is above 155 grams per liter.

If extremely high covering power is desired from the pigment, the solution such as is produced by filtration is concentrated, the amount depending on the tinting strength required. Contrary to other processes, we do not remove any of the ferrous sulphate even when we use concentrated solutions. The addition of soluble sulphates is not necessary to maintain high tinting strength, unless there is a deficiency of iron in the original solution; and as the very high TiO$_2$ concentrations are reached (around 250 grams per liter) good results are obtained even at low iron concentrations.

To specifically demonstrate the differences obtainable by the use of added salts, reference should be had to the following tables:

TABLE I.—*Effect of TiO$_2$ concentration, maintaining a uniform low Fe/TiO$_2$ ratio*

| Hydrolysis No | H-188B | H-188C | H-186A | H-188A |
|---|---|---|---|---|
| Total TiO$_2$, g./l | 149.9 | 172.5 | 170 | 252.5 |
| Reduced TiO$_2$ | 3.6 | 4.3 | 1.2 | 6.4 |
| Fe | 34.3 | 38.8 | 37.1 | 56 |
| Ratio $\frac{Fe}{TiO_2}$ | .227 | .225 | .218 | .221 |
| Total H$_2$SO$_4$ | 341.8 | 390.6 | 360 | 568 |
| Free H$_2$SO$_4$ | 97.9 | 111.5 | 87 | 160 |
| Active H$_2$SO$_4$ | 281.6 | 322.5 | 294.8 | 496.6 |
| F. A., percent | 53.4 | 52.8 | 41.7 | 51.6 |
| Percent TiO$_2$ as gel seed | 2.0 | 2.0 | 2.0 | 2.0 |
| Percent tinting strength | 50 | 65 | 70 | 120 |

All precipitates were calcined under identical conditions.

Note that increased TiO$_2$ concentrations give increased covering. This was known to the prior art; the Fe/TiO$_2$ ratio shown in this table is the conventional prior art standard, except that H-188A is much more concentrated than is handled in conventional practice.

TABLE II.—*Effect of increasing Fe/TiO₂ ratios on low TiO₂ concentration solutions*

| Hydrolysis No | H-188B | H-156 | H-189C | H-190A | H-186E | H-186G | H-186F |
|---|---|---|---|---|---|---|---|
| Total TiO2, g./L | 149.9 | 136.8 | 134.9 | 129.8 | 120.8 | 128.4 | 114.4 |
| Reduced TiO₂ | 3.6 | 1.8 | 3.1 | 2.8 | 1.3 | Present | 1.6 |
| Fe | 34.3 | 96.0 | 99.9 | 128.5 | 148.1 | 34.6 | 37.0 |
| Ratio Fe/TiO₂ | .227 | .703 | .74 | .999 | 1.23 | .269 | .323 |
| Total H₂SO₄ | 341.8 | | 406.1 | 454.9 | 488.3 | | |
| Free H₂SO₄ | 97.9 | | 65.6 | 70.6 | 80.3 | | |
| Active H₂SO₄ | 261.6 | | 230.8 | 228.4 | 228.3 | | |
| Other soluble sulphate | None | None | None | None | None | 740 MgSO₄.7H₂O | 426 Na₂SO₄ |
| Ratio Fe+Fe equiv. as soluble sulphate / TiO₂ | .227 | .703 | .74 | .999 | 1.23 | 1.57 | 1.78 |
| F. A., percent | 53.4 | 49.2 | 39.6 | 44.7 | 54.2 | 59.3 | 61 |
| Percent TiO₂ as gel seed | 2.0 | 2.0 | 2.0 | 2.0 | 2.0 | 2.0 | 2.0 |
| Percent tinting strength | 50 | 60 | 75 | 100 | 100 | 100 | 100 |

Note that as the Fe/TiO₂ ratio increases, even with decreasing concentrations of TiO₂, the pigment properties are improved. The last two examples show the substitution of other soluble salt for the iron.

TABLE III.—*Effect of increasing Fe/TiO₂ ratios on medium TiO₂ concentration solutions*

| Hydrolysis No | H-188B | H-182A | H-188D | H-186B | H-190B | H-186D |
|---|---|---|---|---|---|---|
| Total TiO₂, g./l | 149.9 | 153.0 | 158.0 | 158.3 | 154.3 | 158 |
| Reduced TiO₂ | 3.6 | 3.5 | Present | .4 | 3.56 | 2.7 |
| Fe | 34.3 | 102.6 | 127.0 | 133.7 | 154.3 | 37.1 |
| Ratio Fe/TiO₂ | .227 | .672 | .803 | .844 | 1.0 | .235 |
| Total H₂SO₄ | 341.8 | 481.6 | 524.3 | 503.7 | 549.7 | |
| Free H₂SO₄ | 97.9 | 113.4 | 108.3 | 75.7 | 89.5 | |
| Active H₂SO₄ | 281.6 | 300.6 | 301 | 269.7 | 278.7 | |
| Other soluble sulphate | None | None | None | None | None | 322 ZnSO₄ |
| Ratio Fe+Fe equiv. as soluble sulphate / TiO₂ | .227 | .672 | .803 | .844 | 1.0 | .941 |
| F. A., percent | 53.4 | 60.5 | 61 | 39 | 47.4 | 41.7 |
| Percent TiO₂ as gel seed | 2.0 | 2.0 | 2.0 | 2.0 | 2.0 | 2.0 |
| Percent tinting strength | 50 | 90 | 101 | 100 | 105 | 85 |

Here also increase in Fe/TiO₂ ratio increases tint.

TABLE IV.—*Effect of increasing Fe/TiO₂ ratios on high TiO₂ concentration solutions*

| Hydrolysis No | H-186A | H-185D | H-190C | H-183B | H-186C | H-188E |
|---|---|---|---|---|---|---|
| Total TiO₂, g./l | 170 | 171.2 | 163.2 | 166 | 170 | 165 |
| Reduced TiO₂ | 1.2 | 4.1 | 4.25 | 3.5 | 1.2 | Present |
| Fe | 37.1 | 137.3 | 167 | 113.4 | 37.1 | 91.5 |
| Ratio Fe/TiO₂ | .218 | .803 | 1.02 | .683 | .218 | .554 |
| Total H₂SO₄ | 360 | 530 | 599.8 | | | |
| Free H₂SO₄ | 87 | 79 | 106 | | | |
| Active H₂SO₄ | 294.8 | 289 | 306.8 | | | |
| Other soluble sulphate | None | None | None | 50(NH₄)₂SO₄ | 314 Na₂SO₄ | 105 Na₂SO₄ |
| Ratio Fe+Fe equiv. as soluble sulphate / TiO₂ | .218 | .803 | 1.02 | .812 | .944 | .804 |
| F. A., percent | 41.7 | 37.7 | 53 | 47.5 | 41.7 | 63.7 |
| Percent TiO₂ as gel seed | 2.0 | 2.0 | 2.0 | 2.0 | 2.0 | 2.0 |
| Percent tinting strength | 70 | 100 | 108 | 90 | 95 | 110 |

It will be noted from the above tables that as the $$\frac{Fe}{TiO_2}$$

ratio decreases the TiO₂ concentration must be increased, other conditions being equal, to yield a pigment with approximately equal hiding power. Moreover, it will be seen that comparatively dilute titanium solutions can be used to prepare pigment with high hiding power by the simple expedient of adding FeSO₄ or other soluble sulphates to the titanium solution used for hydrolysis.

The proposed process has certain advantages of commercial value. By its use both the labor and material cost is reduced.

From a production standpoint it is desirable to be able to produce a satisfactory hydrolysis product from a titanium sulphate solution having the maximum TiO₂ concentration obtainable without recourse to evaporation. It is commercially practical to produce clarified solutions with a TiO₂ content up to about 150 grams per liter. By the processes now commercially in use such solutions are not suitable for preparing TiO₂ for use as pigment.

Both the dilution to lower the iron concentration and the crystallization followed by evaporation as now practiced in the two principal processes used commercially are expensive. In the first case, twice the volume of titanium solution has to be used to obtain a given amount of pigment, involving higher handling charges, larger equipment, and greater consumption of steam for heating, while in the second case there is to be considered the added cost for steam and power needed for crystallization and concentration, and the titanium losses incurred. Besides overcoming these disadvantages the proposed process effects still greater economies by the use of titanium solution containing an extremely low free acid concentration.

Another feature of this process is that use is made of the bulk of the FeSO4 left in the mother liquor. By concentrating the mother liquor to about 70% H2SO4, the FeSO4 is precipitated out as the hydrate, copperas. The solids are then removed from the acid, washed with water to remove the adhering acid and used to increase the soluble salt concentration of the titanium solution. The recovered acid is used for digestion of more ore.

As is evident from the examples and tables, our invention resides particularly in the discovery that the pigment properties of hydrolized titanium dioxide can be improved for any given TiO2 concentration by increasing the concentration of soluble sulphates in the hydrolysis solution, and that the soluble sulphate may be ferrous sulphate. This is contrary to the teaching of the prior art, and has resulted for the first time in practical hydrolysis of purified solutions as they are produced in the attack on the ore, without separation of iron, concentration, or dilution.

While low iron-titanium ratios, such as are used by the prior art, give good results with solutions of very high TiO2 content (200 grams per liter and higher), these ratios give poor results with solutions obtainable from ilmenite attack masses without concentration (maximum TiO2 content about 160 grams per liter). The sulphate-titanium ratio should be maintained at fairly high figures for these solutions—a minimum ratio of 0.6 for solutions with a concentration of 160 grams TiO2 per liter is needed to insure good pigment properties. The normal sulphate-titanium ratio in solutions prepared from ilmenite (0.7 to 0.8) gives good results with titanium oxide concentrations of over 150 grams per liter, when used in conjunction with a hydrolysis inducer. As the TiO2 concentration is lowered, higher ratios are necessary; and with the lower range of TiO2 concentrations (100–110 grams per liter) the sulphate-titanium ratio should be maintained at 1.5 or more. Throughout the entire workable range of TiO2 concentration, however, increase of the sulphate-titanium ratio will improve the pigment properties, other conditions remaining constant; and for solutions in the high concentration range (above 200 grams per liter) sulphate-titanium ratios of as low as 0.4 give noticeable improvement over the prior art ratios of 0.12 to 0.30.

Our invention is of course, most adapted to hydrolysis of solutions prepared from ilmenite; but substantially iron-free solutions made from rutile, or other titaniferous material, may be improved by our process, by the addition of soluble sulphates. We do not limit ourselves to the examples given, which merely illustrate the invention.

As is further indicated by the examples and tables, it is necessary to maintain the factor of acidity of the solution between 20 and 70%, and more preferably between 40 and 50, for optimum results.

While we have shown titanium gel as a seeding agent in all our examples, for the sake of making direct comparisons, we have used other means of inducing hydrolysis with good results, including the formation of colloidal titanium dioxide in situ.

In the claims, the term "sulphate-titanium ratio" refers to both the ratio Fe/TiO2, and the ratio Fe+Fe equivalent of soluble sulphate TiO2.

We claim:

1. The method of making titanium dioxide which comprises digesting ilmenite with sulfuric acid, treating the reaction mass to obtain a clarified solution containing more than 100 grams per liter of TiO2 and a factor of acidity above 70%, and containing all the sulfate derived from the ilmenite, adjusting the factor of acidity to from 20% to 70% by adding a substantial amount of a basic compound which forms a soluble sulfate, then hydrolyzing the so-prepared hydrolysis solution, washing and calcining the precipitate.

2. In a process for improving the pigment properties of titanium dioxide, the combination of steps comprising substantially increasing the soluble sulfate-TiO2 ratio of a solution of titanium sulfate containing ferrous sulfate without changing the TiO2 concentration, and then hydrolyzing the so-treated solution by heating at atmospheric pressure.

3. In a process for improving the pigment properties of titanium dioxide the combination of steps comprising adding a sufficient amount of a soluble sulfate to a solution of titanium sulfate containing ferrous sulfate to substantially increase the sulfate-TiO2 ratio, without substantially changing the factor of acidity or the TiO2 concentration of the solution, and then hydrolyzing the so-treated solution by heating at atmospheric pressure.

4. The method of making titanium dioxide which comprises digesting ilmenite with sulfuric acid, treating the reaction mass to obtain a clarified solution containing more than 100 grams per liter of TiO2 and all of the iron sulfate derived from the ilmenite, substantially increasing the soluble sulfate-TiO2 ratio of the solution without substantially changing the TiO2 concentration of the solution, then hydrolyzing the so-prepared hydrolysis solution at atmospheric pressure to precipitate TiO2, and calcining the washed precipitate.

5. The method of making titanium dioxide which comprises digesting ilmenite with sulfuric acid, treating the reaction mass to obtain a clarified solution containing more than 100 grams of TiO2 per liter and all of the iron sulfate derived from the ilmenite, adding a water-soluble sulfate to the solution to substantially increase the sulfate-TiO2 ratio without substantially changing the factor of acidity or the TiO2 concentration of the solution then hydrolyzing the so-prepared hydrolysis solution at atmospheric pressure to precipitate TiO2, and calcining the washed precipitate.

6. The process of claim 4 in which the factor of acidity of the hydrolysis solution is maintained between 20% and 70%.

7. The process of claim 4 in which the soluble sulfate-TiO2 ratio is increased by the addition of a soluble sulfate of a metal other than iron.

BENJAMIN WILSON ALLAN.
L'ROCHE G. BOUSQUET.